(12) United States Patent  
Sasaki et al.

(10) Patent No.: US 8,786,913 B2  
(45) Date of Patent: Jul. 22, 2014

(54) IMAGE READING APPARATUS AND IMAGE FORMING APPARATUS

(71) Applicant: Canon Finetech Inc., Misato (JP)

(72) Inventors: Takeshi Sasaki, Tsukuba (JP); Saori Yokote, Noda (JP)

(73) Assignee: Canon Finetech Inc., Misato-shi (JP)

( * ) Notice: Subject to any disclaimer, the term of this patent is extended or adjusted under 35 U.S.C. 154(b) by 0 days.

(21) Appl. No.: 13/741,977

(22) Filed: Jan. 15, 2013

(65) Prior Publication Data

US 2013/0222862 A1    Aug. 29, 2013

(30) Foreign Application Priority Data

Jan. 16, 2012 (JP) ................. 2012-006602  
Nov. 30, 2012 (JP) ................. 2012-263698

(51) Int. Cl.  
*H04N 1/04* (2006.01)

(52) U.S. Cl.  
USPC ........................... 358/474; 358/497; 358/501

(58) Field of Classification Search  
CPC . H04N 1/02481; H04N 1/00549; G02B 7/02; G02B 26/10; G02B 7/002; G02B 7/003; G02B 7/20; G02B 226/00; A61B 1/00188; A61B 1/00172  
USPC ......... 358/474, 497, 475, 509, 482, 483, 486, 358/501  
See application file for complete search history.

(56) References Cited

U.S. PATENT DOCUMENTS

| | | | |
|---|---|---|---|
| 5,489,995 A * | 2/1996 | Iso et al. ................. | 358/483 |
| 5,617,131 A * | 4/1997 | Murano et al. ............ | 347/233 |
| 5,715,099 A | 2/1998 | Takemoto | |
| 5,864,437 A | 1/1999 | Takemoto | |
| 5,913,091 A * | 6/1999 | Nanba et al. ............. | 399/32 |
| 5,936,239 A | 8/1999 | Tsai et al. | |
| 6,208,828 B1 * | 3/2001 | Awai et al. .............. | 399/361 |
| 6,743,162 B2 * | 6/2004 | Hieber et al. ............ | 493/457 |

(Continued)

FOREIGN PATENT DOCUMENTS

| | | |
|---|---|---|
| JP | 07-297993 | 11/1995 |
| JP | 10-250150 | 9/1998 |

(Continued)

OTHER PUBLICATIONS

Communication—European Patent Appln. No. 13151160.2. dated Apr. 18, 2013, European Patent Office.

*Primary Examiner* — Negussie Worku  
(74) *Attorney, Agent, or Firm* — Fitzpatrick, Cella, Harper & Scinto (57) ABSTRACT

An image reading apparatus configured to read an image of an original, including: a light source configured to irradiate the original with light; an optical system configured to condense and image a light beam from the light source reflected from the original; a substrate member having a photoelectric conversion unit; a fixing member fixed to the substrate member; a support member configured to support the optical system; and an adhesive bonding the fixing member and the support member together, wherein one of the support member and the fixing member has a protruding portion which protrudes toward the other of the support member and the fixing member, the other has a recessed portion opposed to the protruding portion, the protruding portion protrudes in the recessed portion in a non-contact state to maintain a gap between the protruding portion and the recessed portion, and the adhesive is applied to the gap.

20 Claims, 7 Drawing Sheets

(56) References Cited

U.S. PATENT DOCUMENTS

| | | | |
|---|---|---|---|
| 6,795,257 B2 | 9/2004 | Andoh et al. | |
| 6,940,542 B2* | 9/2005 | Kitazawa et al. | 348/208.99 |
| 7,242,502 B2* | 7/2007 | Huang et al. | 358/475 |
| 7,251,883 B2* | 8/2007 | Nakamura et al. | 29/834 |
| 7,428,093 B2* | 9/2008 | Tegreene et al. | 359/290 |
| 7,555,333 B2* | 6/2009 | Wang et al. | 600/476 |
| 7,594,319 B2* | 9/2009 | Nakamura et al. | 29/833 |
| 7,778,536 B2* | 8/2010 | Okamura | 396/55 |
| 8,238,736 B2* | 8/2012 | Tsuruta et al. | 396/55 |
| 8,310,737 B2* | 11/2012 | Nagao et al. | 358/475 |
| 8,373,908 B2* | 2/2013 | Hombo | 358/474 |
| 8,396,535 B2* | 3/2013 | Wang et al. | 600/476 |
| 8,451,551 B2 | 5/2013 | Miyanagi | |
| 8,593,701 B2* | 11/2013 | Soeda et al. | 358/474 |
| 8,599,450 B2* | 12/2013 | Kubo et al. | 358/498 |
| 2001/0024299 A1 | 9/2001 | Sawada | |
| 2002/0163581 A1* | 11/2002 | Kitazawa et al. | 348/208.6 |
| 2005/0040324 A1 | 2/2005 | Kobayashi | |
| 2009/0034297 A1 | 2/2009 | Tahk et al. | |

FOREIGN PATENT DOCUMENTS

| | | |
|---|---|---|
| JP | 2006-211244 A | 8/2006 |
| JP | 4113320 B2 | 7/2008 |
| JP | 4202988 B2 | 12/2008 |
| JP | 2011-216980 A | 10/2011 |

* cited by examiner

IMAGE READING APPARATUS AND IMAGE FORMING APPARATUS

BACKGROUND OF THE INVENTION

1. Field of the Invention

The present invention relates to an image reading apparatus configured to read an image of an original, which includes a light source configured to irradiate the original with light, an optical system configured to condense and image a light beam from the light source reflected back from a surface of the original, and a substrate member having a photoelectric conversion unit arranged at an imaging position of the optical system. Further, the present invention relates to an image forming apparatus including the image reading apparatus.

2. Description of the Related Art

Conventionally, in an image reading apparatus, it has been necessary to adjust and fix a lens as an optical system and a sensor such as a charge coupled device (CCD) as a photoelectric conversion unit at highly accurate relative positions so as to read an image of an original with satisfactory image quality. The satisfactory image quality refers to quality of an image obtained at correct focus point and magnification with less chromatic aberration. Although the accuracy of positional adjustment depends on the type and size of a lens, accuracy on the order of micrometers is required in a case of a lens of a general reduction optical system. As a fixing method to be performed after the positional adjustment, there have conventionally been employed a fixing method with a screw or soldering, a bonding method with an adhesive or an ultraviolet (UV) curable resin, and the like.

The screw fixing is advantageous in that the fixing and releasing are easy, but is less accurate because of the disadvantage in that, due to the characteristics of the screw fixing method, the member is fixed by a given pressing force or greater and hence the fixed member may be deformed and moved along with the screw fastening. The soldering also provides easiness in the fixing and releasing, but the shrinkage amount at the time when solder is cooled and solidified is as large as several tens of micrometers, and the shrinkage amount changes depending on the amount of solder. Thus, accurate and stable fixing is difficult.

The adhesive other than the UV curable resin is disadvantageous in that it is difficult to unfix the member, but is advantageous in that the shrinkage amount at the time of curing is small. However, some adhesives require several hours or longer to be completely cured, or generate gas which fogs the lens or the like, and hence those adhesives need to be handled carefully. There is an instant adhesive which is cured within a short period of time, but this type of adhesive is cured through contact with moisture in the air, which leads to a drawback in that the curing time varies slightly.

Similarly to general adhesives, the UV bonding has difficulty in unfixing the member, and further, the member to be bonded and the like need to be transparent in many cases so as to securely irradiate the adhesive with UV light, which leads to a drawback in that the material to be used is limited. However, the shrinkage amount at the time of curing is as small as about 1% to 5% relative to the volume, and this shrinkage amount is equal to or smaller than that of the other types of adhesive. Thus, the UV bonding is an optimum method to ensure the fixing position on the order of micrometers. The curing time is several tens of seconds required during UV light irradiation, and the curing shrinkage amount is small as well. Thus, the UV bonding is convenient. Further, the UV bonding has a significant advantage in that the curing shrinkage amount and the curing time can be controlled appropriately by adjusting the UV light irradiation period and the adhesive application amount. The use of the UV bonding method is an optimum measure to positionally adjust and fix the optical system and the photoelectric conversion unit of the image reading apparatus on the order of micrometers.

As the inventions of fixation of the UV bonding method, the inventions of Japanese Patent No. 4,202,988 and Japanese Patent No. 4,113,320 are disclosed. The invention of Japanese Patent No. 4,202,988 relates to an image reading apparatus in which a holding member (support member) configured to hold a lens and a substrate member having a photoelectric conversion unit are coupled to each other through an intermediate holding member. The invention of Japanese Patent No. 4,113,320 relates to an image reading apparatus in which a housing (support member) configured to hold a lens and a substrate member having a photoelectric conversion unit are coupled to each other through an intermediate holding member.

However, in Japanese Patent No. 4,202,988 and Japanese Patent No. 4,113,320, the intermediate member is additionally required to couple the substrate member and the support member to each other.

Further, when the intermediate member is bonded with a photocurable adhesive, the intermediate member needs to be transparent so that the choice of materials is limited.

Still further, when joining the substrate member and the support member to each other, the substrate member and the support member are coupled to each other with an adhesive in a state in which the substrate member and the support member are in contact with the intermediate member, and hence, in the stage of positional adjustment between the substrate member and the support member, the movement of the substrate member and the support member is restricted so that the positional adjustment cannot be performed freely.

SUMMARY OF THE INVENTION

In view of the above-mentioned circumstances, the present invention provides an image reading apparatus in which a fixing member fixed to a substrate member and a support member configured to support an optical system can be coupled with each other on the assumption that highly accurate positional adjustment is performed without the need for other coupling components and transparent members.

In view of the above-mentioned circumstances, an image reading apparatus configured to read an image of an original according to an embodiment of the present invention, includes: a light source configured to irradiate the original with light; an optical system configured to condense and image a light beam emitted from the light source and reflected from a surface of the original; a substrate member having a photoelectric conversion unit arranged in an imaging position of the optical system; a fixing member fixed to the substrate member; a support member configured to support the optical system; and an adhesive bonding the fixing member and the support member together, wherein one of the support member and the fixing member has a protruding portion which protrudes toward other of the support member and the fixing member, wherein the other of the support member and the fixing member has a recessed portion which is opposed to the protruding portion, wherein the protruding portion is arranged to protrude in the recessed portion in a non-contact state to maintain a gap between the protruding portion and the recessed portion, and wherein the adhesive is applied to the gap between the protruding portion and the recessed portion.

The present invention provides an image forming apparatus including the image reading apparatus.

Further features of the present invention will become apparent from the following description of exemplary embodiments with reference to the attached drawings.

DESCRIPTION OF THE EMBODIMENT

In the following, an exemplary mode for carrying out the present invention will be described in detail for an illustrative purpose based on an embodiment with reference to the accompanying drawings. Note that, dimensions, materials, shapes, and relative positions of components, and the like to be described in the embodiment may be changed as appropriate depending on a configuration of an apparatus to which the present invention is applied, or various conditions. Therefore, unless otherwise noted, the scope of the present invention is not limited only to those factors.

Figure 1:
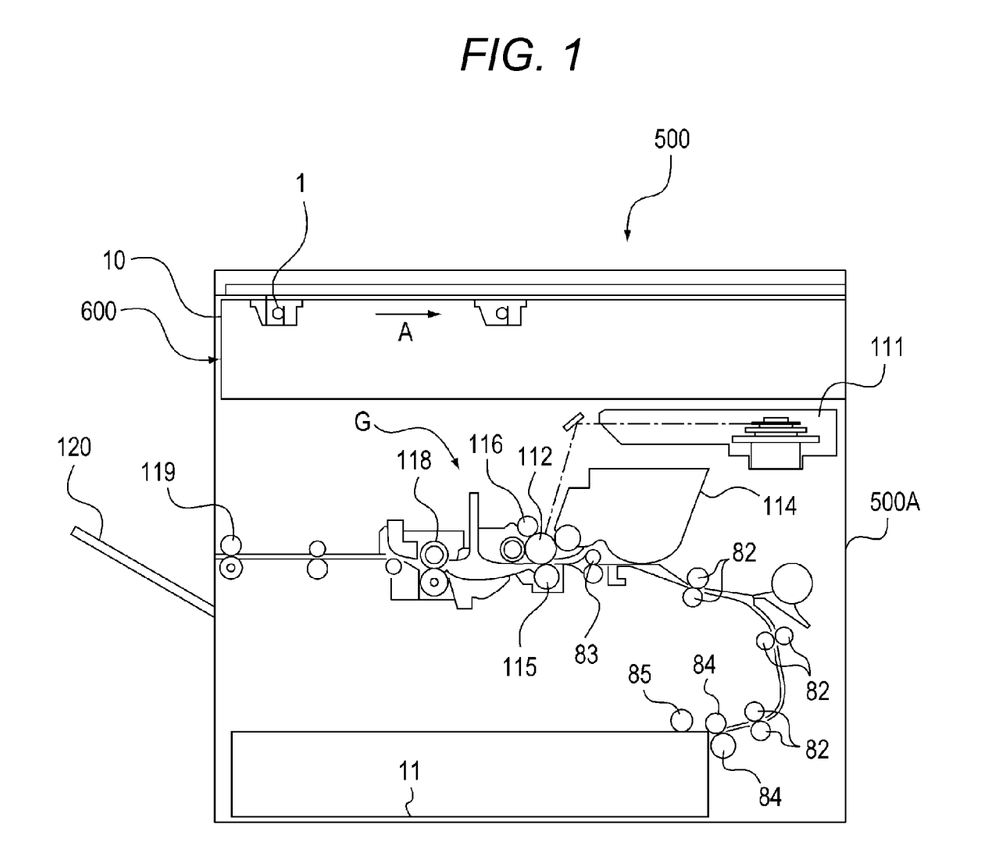
FIG. 1 is a sectional view of illustrating a configuration of an image forming apparatus according to an embodiment of the present invention.

FIG. 1 is a sectional view of illustrating a configuration of an image forming apparatus 500 according to the embodiment of the present invention. The image forming apparatus 500 is an image forming apparatus using an electrophotographic image forming process. As illustrated in FIG. 1, the image forming apparatus 500 has an image forming apparatus main body (hereinafter referred to simply as "apparatus main body") 500A, and an image forming portion G configured to form an image is provided inside the apparatus main body 500A. The image forming portion G includes a photosensitive drum 112 as an "image bearing member" and a transfer roller 115 as a "transfer device". At least the photosensitive drum 112 may be included in a process cartridge which is detachably mountable to the apparatus main body 500A.

A storage cassette 11 configured to store sheets, a pickup roller 85, a feed roller pair 84, conveyance roller pairs 82, and a registration roller pair 83 are provided inside the apparatus main body 500A. Further, the photosensitive drum 112, the transfer roller 115, a charging roller 116, an exposure device 111, a developing device 114, a fixing device 118, and a delivery roller pair 119 are arranged inside the apparatus main body 500A. A tray 120 is provided outside the apparatus main body 500A. An image reading apparatus 600 configured to read an image of an original is arranged on an upper part of the apparatus main body 500A. The image reading apparatus 600 includes a frame member 10. An optical unit 1 (described later with reference to FIGS. 2, 3A, and 3B) is arranged inside the frame member 10.

Figure 2:
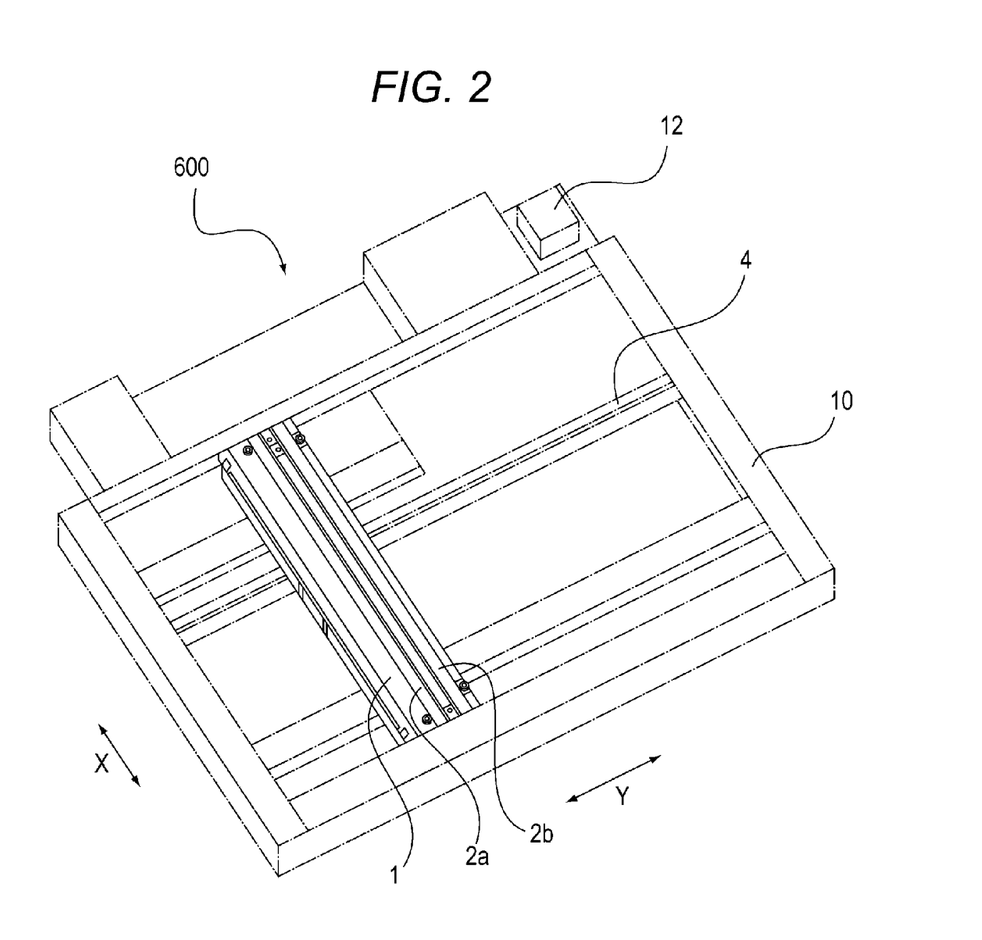
FIG. 2 is a perspective view of illustrating a configuration of an image reading apparatus including an integrated unit (integrated scanning optical unit).

FIG. 2 is a perspective view of illustrating a configuration of the image reading apparatus 600 including the integrated scanning optical unit (optical unit) 1. As illustrated in FIG. 2, the optical unit 1 reads, by a CCD sensor 70 (see FIG. 4) as a photoelectric conversion unit, an image of an original placed on a platen glass (not shown) installed on the frame 10 with a front side of the original facing downward while scanning the original on a lower side of the platen glass. At this time, the scanning direction of the optical unit 1 is referred to as "sub scanning direction Y", and a direction perpendicular to the sub scanning direction Y is referred to as "main scanning direction X". The optical unit 1 includes LEDs 2a and 2b as a light source. Note that, the image reading apparatus 600 also includes a motor 12 configured to move the optical unit 1 in the sub scanning direction, and a shaft 4 configured to guide the optical unit 1 in the sub scanning direction.

Figure 3A:
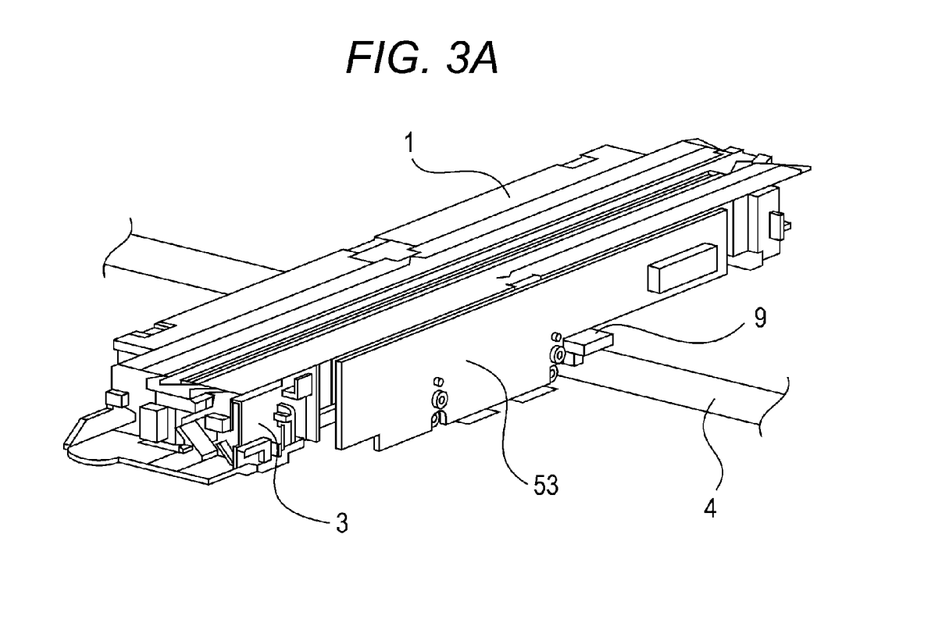
FIG. 3A is a perspective view of illustrating a configuration of the integrated unit as seen from above obliquely.
Figure 3B:
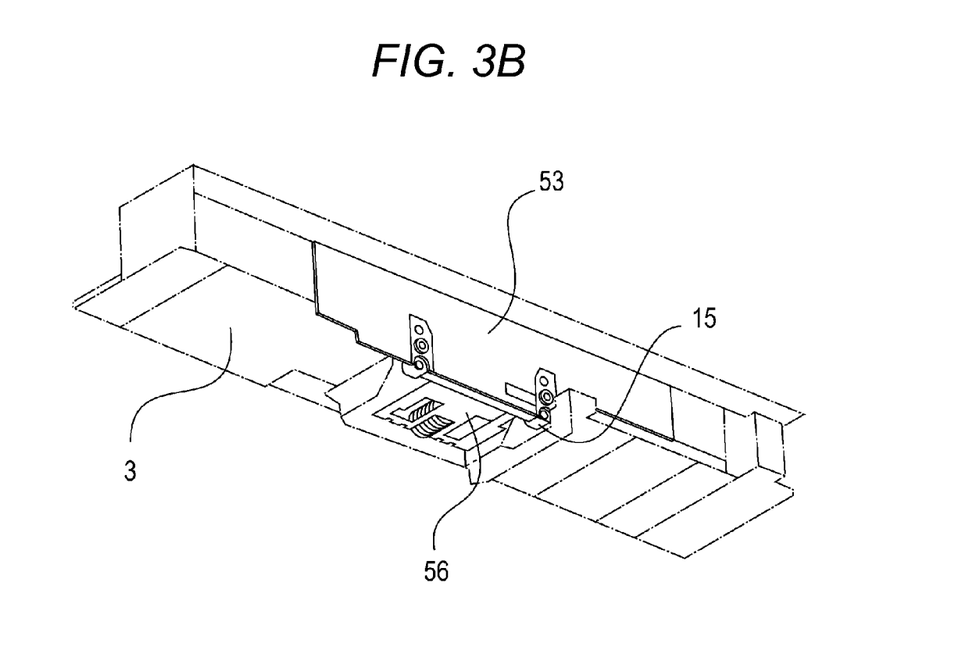
FIG. 3B is a perspective view of illustrating the configuration of the integrated unit as seen from below obliquely.

FIG. 3A is a perspective view of illustrating a configuration of the optical unit 1 as seen from above obliquely. FIG. 3B is a perspective view of illustrating the configuration of the optical unit 1 as seen from below obliquely. As illustrated in FIGS. 3A and 3B, an optical holding member 56 is fixed to a lower portion of a housing of the optical unit 1, and a fixing member 15 and a substrate member 53 are fixed to a side portion of the housing 3 of the optical unit 1. The optical unit 1 is an integrated unit including an illumination unit such as the LEDs 2a and 2b, a plurality of mirrors (including a mirror 7, see FIG. 7B), a lens 55 (see FIG. 5), and the CCD sensor (see FIG. 4).

The illumination unit is a unit configured to illuminate an original with light in the main scanning direction X. When the illumination light is reflected from a surface of the original, the plurality of mirrors reflect the reflection light from the original, and guide the light beam to the lens 55 while adjusting a path of the light beam. The lens 55 images, on the CCD sensor 70, a light beam obtained by condensing at least part of the reflection light from the plurality of mirrors. In FIG. 3B, the substrate member 53 having the CCD sensor 70 and the optical holding member 56 configured to support the lens 55 define an outer shape of the optical unit 1.

The number, position, reflection angle, and optical path length of the mirrors need to be set as appropriate according to the size of the entire image reading apparatus, the properties of the lens 55, and the light intensity of the illumination. Such setting is not limited to the case of the optical unit 1, and is performed in the same manner for an image reading apparatus configured to read an image in the main scanning direction X while scanning the original in the sub scanning direction Y.

The light beam passing through the lens 55 is imaged on a light receiving surface of the CCD sensor 70. The CCD sensor 70 has CCDs 71 (see FIG. 4) as photoelectric conversion elements arrayed in the main scanning direction X. The light receiving surface of the CCD sensor 70 is elongated in the main scanning direction X, and receives information on an original in the main scanning direction X as light intensity in conjunction with the illumination of irradiating the original in the same main scanning direction X. The light intensity is stored in the photoelectric conversion elements, and the light intensity is converted into an electric charge amount to be transferred as image information. In this manner, the image of the original is read.

Color filters are applied to an incident surface of each photoelectric conversion element described above in accordance with color information to be read, and are arrayed in the vertical direction. The position of the light receiving surface of the CCD sensor 70 is adjusted as appropriate substantially at a focus position of the lens 55 in view of, for example, variation in the focal point of the lens 55 to be used, variation in the holding member, and variation in mounting of the CCD sensor 70. The reflection light from an original that is imaged by the lens 55 is received on the light receiving surface of the CCD sensor 70, and the light intensity is converted into an electric signal. After that, the image information in the form of the electric signal undergoes processing at a software image processor, and a read image is obtained as a result.

The distance between the lens 55 and the CCD sensor 70 is affected by image properties such as the resolution, magnification, and position of the read image, and this distance is very sensitive. Therefore, in order to obtain a more satisfactory image, it is essential to appropriately adjust and constantly maintain the distance between the lens 55 and the CCD sensor 70.

Figure 4:
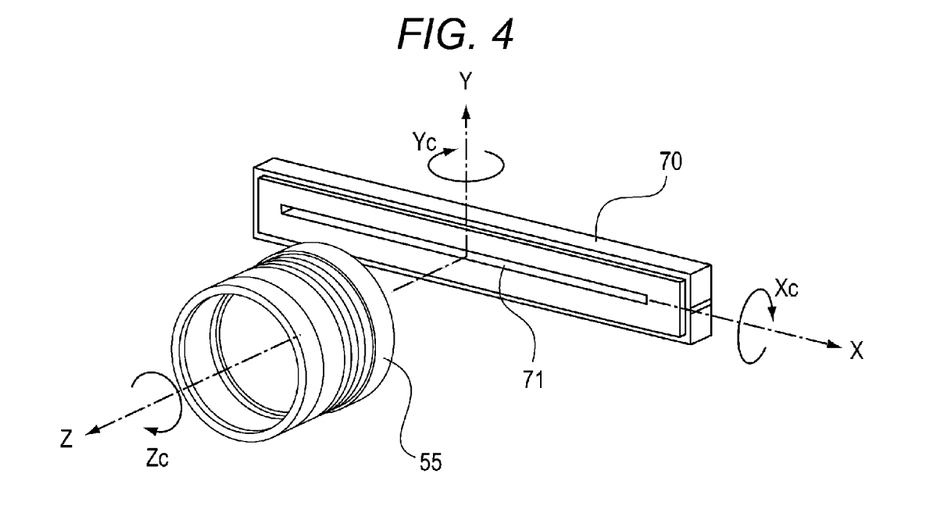
FIG. 4 is a perspective view of illustrating an arrangement relationship between a lens and a CCD sensor.

FIG. 4 is a perspective view of illustrating an arrangement relationship between the lens 55 and the CCD sensor 70. Referring to FIG. 4, positional adjustment between the lens 55 and the CCD sensor 70 will be described below. The CCD 71 or a complementary metal-oxide semiconductor (CMOS) is used for the sensor of the image reading apparatus configured to read an image of an original. The CCD sensor 70 has the photoelectric conversion elements 71 arrayed (in the main scanning direction X) at a center position in the vertical direction.

The positional adjustment is generally performed by a method of moving the CCD sensor 70 in a state in which the lens 55 is fixed, but a method of moving the lens 55 may be employed as well in terms of the positional adjustment between the lens 55 and the CCD sensor 70. However, when the lens 55 is moved, the position of a plane on which an image of an original is read is also changed at the same time, and hence the method of moving the CCD sensor 70 is reasonable as a method of positional adjustment in the image reading apparatus 600 configured to read an image of an original that is placed on the glass surface. Note that, as the reduction factor of the lens is larger, the accuracy of adjustment in the X-, Y-, and Z-directions needs to be higher. The accuracy of adjustment in the Z-direction becomes tighter in proportion to the square of the reduction factor of the lens, and hence the highest accuracy is required for adjustment in the Z-direction.

The adjustment needs to be performed in a total of six-axis directions, specifically, the X-, Y-, and Z-directions and the Xc-, Yc-, and Zc-directions which are rotational directions about the X-, Y-, and Z-directions, respectively. Note that, the main scanning direction corresponds to the X-direction, and the sub scanning direction corresponds to the Y-direction.

When positionally adjusting the CCD sensor 70, the focal point, the color misregistration amount, and the center and inclination as geometric positions are confirmed. Positional adjustment in the X-direction, positional adjustment in the Y-direction, and positional adjustment in the Z-direction respectively refer to adjustment of the center of main scanning, adjustment of the center of sub-scanning, and adjustment of the focal point and color misregistration amount. Further, positional adjustment in the Xc-direction, positional adjustment in the Yc-direction, and positional adjustment in the Zc-direction respectively refer to adjustment of the balance of the focal point and the color misregistration among the sensors of the respective colors which are arrayed in the sub scanning direction, adjustment of the balance of the focal point and the color misregistration at the end portions in the main scanning direction, and adjustment of the inclination relative to an original which is subjected to image reading.

It is desired that the accuracy of adjustment be set to about 1 μm to 10 μm. Higher accuracy is preferred, but accuracy of 1 μm or less does not produce any particular difference in focal point and color misregistration amount, and hence the above-mentioned accuracy of about 1 μm to 10 μm is a reasonable range. The highest accuracy is required for the positional adjustment in the Z-direction and the positional adjustment in the Yc-direction, and the length in the optical axis direction (focal length) relative to an original needs to be adjusted with high accuracy. Those directions are referred to as "axial magnification directions" of the lens.

For the other directions, there is no particular problem in practical use even when the adjustment is performed with accuracy of 10 μm to 30 μm, but finer adjustment definitely leads to accurate image reading. The X-, Y-, and Zc-directions are generally referred to as "linear magnification directions" of the lens.

The axial magnification changes in proportion to the square of the distance relative to the linear magnification, and hence movement in the axial magnification directions needs to be performed with high accuracy.

Note that, in the above-mentioned configuration of Japanese Patent No. 4,113,320, the lens can be adjusted only in the Z- and Zc-directions of FIG. 4, and the sensor can be adjusted only in the Z-, Zc-, and X-directions. The intermediate member is not large enough to perform adjustment in the Y-direction, let alone in the Xc- and Yc-directions. For the directions in which the adjustment cannot be performed, the position can be determined to some extent due to the accuracy of the components, but in this case, the accuracy is expected to be 100 μm or more, and hence the accuracy is considered to be lower than that of the configuration in which the adjustment can be performed. Also from the fact describe above, according to the embodiment of the present invention, the following image reading apparatus is preferred for positionally adjusting and fixing the lens and the sensor. That is, it can be said that an optimum image reading apparatus enables positional adjustment in all the directions without increasing the number of components, enables positional alignment, positional adjustment, adhesive application, and UV light irradiation without increasing the scale of the apparatus, and enables the operation involving positional adjustment and fixing while maintaining high accuracy.

Figure 5:
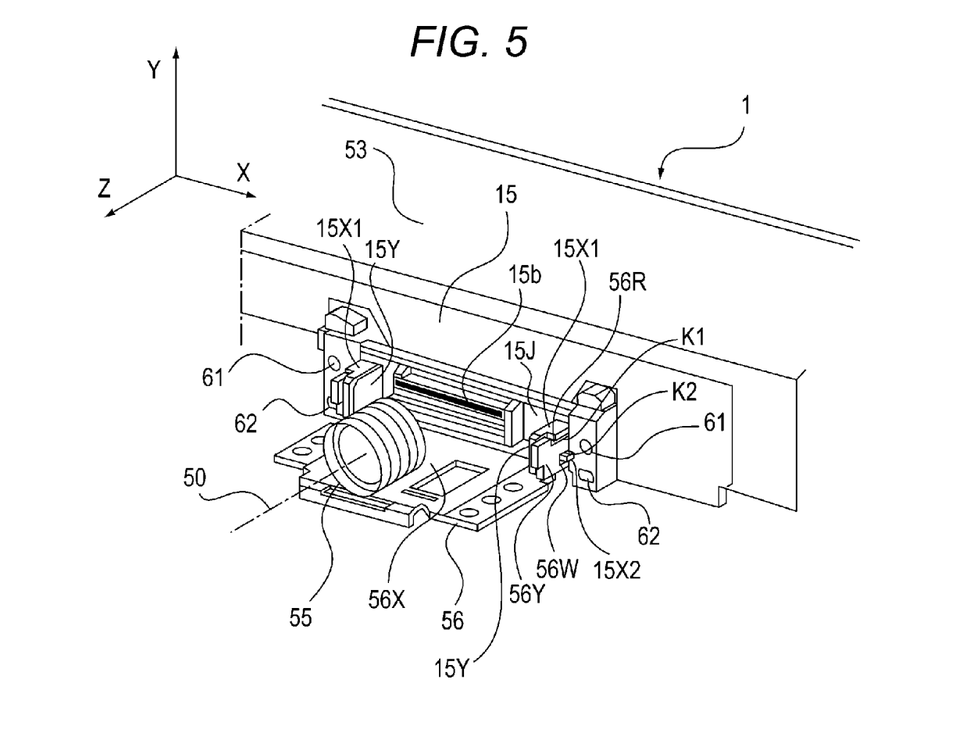
FIG. 5 is a partially enlarged perspective view of illustrating the configuration of the integrated unit in a state in which an adhesive is not applied.

FIG. 5 is a partially enlarged perspective view of illustrating the configuration of the optical unit 1 in a state in which an adhesive is not applied. As illustrated in FIG. 5, the optical unit 1 includes the lens 55 as an "optical system" and the substrate member 53. The lens 55 is configured to condense and image a light beam which is emitted from the LEDs 2a and 2b (see FIG. 2) as the "light source" configured to irradiate an original with light, and is reflected from the surface of the original. The substrate member 53 has the CCDs 71 as the "photoelectric conversion elements" which are part of the "photoelectric conversion unit" arranged at an imaging position of the lens 55.

The fixing member 15 is fixed to the substrate member 53. The fixing member 15 has an aperture portion 15b to guide convergent light, which is obtained by converging light at the lens 55, to the CCDs 71 (photoelectric conversion elements)

and blocks non-convergent light (stray light). Thus, the fixing member 15 serves also as a shielding member as a "shielding unit" configured to cover and shield the photoelectric conversion elements 71 to prevent a light beam other than a proper light beam from reaching the photoelectric conversion elements 71. The proper light beam refers to a light beam which is reflected from an original and then passes through the lens 55 along a proper optical path so as to be imaged on the photoelectric conversion elements 71. As described above, the fixing member 15 serves also as the shielding unit (so-called "hood") configured to shield the photoelectric conversion elements 71 to prevent a light beam other than the proper light beam from reaching the photoelectric conversion elements 71, and hence the number of components can further be reduced.

The optical holding member 56 is fixed to the fixing member 15 with an adhesive which will be described later in detail. The optical holding member 56 supports the lens 55 (in this case, the lens 55 is placed on the optical holding member 56). In front of the lens 55, the mirror 7 (see FIG. 7B) is arranged. Part of the reflection light that is reflected from the surface of an original is condensed at the lens 55, and passes through the aperture portion 15b of the fixing member 15 to reach the CCDs 71 mounted on the substrate member 53. In the following, a connection configuration which connects the fixing member 15 and the optical holding member 56 to each other will be described below in detail.

The optical unit 1 includes the fixing member 15, the optical holding member 56 as a "support member", and a UV adhesive Q as a "photocurable adhesive". The fixing member 15 is fixed to the substrate member 53, and the optical holding member 56 supports the lens 55. The UV adhesive Q is used for bonding the fixing member 15 and the optical holding member 56 to each other.

The fixing member 15 includes a planar portion 15J extending in a direction orthogonal to the axis of the lens 55. Further, the fixing member 15 includes first plate-shaped portions 15Y extending in an up-down direction including the axis of the lens 55. The first plate-shaped portions 15Y overlap with the axis of the lens 55 as viewed along a direction perpendicular to the up-down direction. In this case, the first plate-shaped portions 15Y and the planar portion 15J are orthogonal to each other. Still further, the fixing member 15 includes bending and protruding portions 15X1 which bend and protrude respectively from the first plate-shaped portions 15Y in the direction orthogonal to the axis of the lens 55, and axial protruding portions 15X2 which protrude respectively from the first plate-shaped portions 15Y in a direction parallel to the axis of the lens 55. Note that, the first plate-shaped portions 15Y and the planar portion 15J do not need to be orthogonal to each other, and may be inclined relative to each other at a predetermined angle.

The optical holding member 56 includes a support surface portion 56X which supports the lens 55. Further, the optical holding member 56 includes second plate-shaped portions 56Y extending in the up-down direction including the axis of the lens 55. The second plate-shaped portions 56Y overlap with the axis of the lens 55 as viewed along the direction perpendicular to the up-down direction. In this case, the support surface portion 56X and the second plate-shaped portions 56Y are orthogonal to each other. Still further, the optical holding member 56 includes peripheral edge portions (recessed portion) 56R which are formed in the second plate-shaped portions 56Y and opposed to the bending and protruding portions 15X1, respectively, and cut-away portions (recessed portion) 56W which are formed in the second plate-shaped portions 56Y and opposed to the axial protruding portions 15X2, respectively. Note that, the support surface portion 56X and the second plate-shaped portions 56Y do not need to be orthogonal to each other, and may be inclined relative to each other at a predetermined angle.

The first plate-shaped portions 15Y and the second plate-shaped portions 56Y, the bending and protruding portions 15X1 and the peripheral edge portions 56R, and the axial protruding portions 15X2 and the cut-away portions 56W are respectively arranged while crossing each other in a non-contact state to maintain a gap therebetween. In this case, in particular, the state of crossing refers to a state in which each bending and protruding portion 15X1 extends beyond the corresponding peripheral edge portion 56R in the direction orthogonal to the axis of the lens 55. Further, in particular, the state of crossing refers to a state in which each axial protruding portion 15X2 extends beyond the corresponding cut-away portion 56W in the direction orthogonal to the axis of the lens 55. The UV adhesive Q is applied, adhered, and irradiated with light in a gap K1 between the bending and protruding portion 15X1 and the peripheral edge portion 56R and in a gap K2 between the axial protruding portion 15X2 and the cut-away portion 56W. Note that, the axial protruding portion 15X2 protrudes further in the direction orthogonal to the axis of the lens 55 as compared to the bending and protruding portion 15X1. Such a configuration is intended to facilitate coupling due to the difficulty in coupling between the axial protruding portions 15X2 and the optical holding member 56 as compared to the bending and protruding portion 15X1, and to prevent dripping of the liquid UV adhesive.

When fixing the fixing member 15 to the optical holding member 56, each second plate-shaped portion 56Y is arranged on the outer side of the corresponding first plate-shaped portion 15Y. The surface of the first plate-shaped portion 15Y and the surface of the second plate-shaped portion 56Y are opposed to each other, and a predetermined clearance L is ensured therebetween. Adhesive application portions 60 for the UV adhesive Q for bonding the fixing member 15 and the optical holding member 56 to each other are located in any one of the gaps K1 and K2 formed between the fixing member 15 and the optical holding member 56 (see FIGS. 7A and 7B). The gaps K1 and K2 are arranged at such positions that light can reach the gaps K1 and K2 from the outside. Note that, the optical holding member 56 and the fixing member 15 may be made of different materials. For example, the optical holding member 56 is made of a metal sheet, and the fixing member 15 is made of a resin.

Now, the necessity of positional adjustment between the lens 55 and the photoelectric conversion elements 71 will be described. In general, the lens 55 is formed of a plurality of lenses, and the focal point varies depending on the relative positions thereamong. Further, depending on the difference in shape of each single lens and the accuracy of the optical holding member 56, assembly errors occur in the parameters such as the focal length, the center positions in the main scanning direction and the sub scanning direction, and the inclination relative to an original.

The errors occurring in the focal length of the single lens and the accuracy of geometric positions such as the center and inclination, and occurring due to chromatic aberrations in the magnification direction and the axial direction may generally be deviations of several micrometers to several tens of micrometers. Further, the assembly errors occurring when the lens 55 is placed on the optical holding member 56 and when the fixing member 15 is fixed to the substrate member 53 may exceed several hundreds of micrometers in many cases. Therefore, positional adjustment is essential between the lens 55 and the photoelectric conversion elements 71 so as to cancel the above-mentioned various errors. That is, in order to read information of an original with high accuracy, it is necessary to perform positional adjustment under a condition that the movable range is several hundreds of micrometers or more and the accuracy of adjustment, that is, the resolution of adjustment is about several micrometers.

In this case, when performing the positional adjustment, a jig is used for ensuring the above-mentioned accuracy. The fixing member 15 fixed to the substrate member 53 is held by an adjustment jig to perform adjustment for the lens in the X-, Y-, Z-, Yc-, and Zc-directions (see FIG. 4). The adjustment in the Xc-direction is not performed because the distances between the sensors of the respective colors which are arrayed in the vertical direction are as small as several micrometers and hence, even when the adjustment in the Xc-direction is performed, the changes in focal point and color misregistration amount of the sensors of the respective colors are very small.

The adjustment jig and the fixing member 15 are positionally aligned with respect to holes 61 which are formed in the fixing member 15 with high accuracy to serve as a reference of the positional alignment. The CCD sensor is mounted on the substrate with high accuracy in alignment with the holes 61, and hence, even when the fixing member 15 is held by the adjustment jig, the position of the CCD sensor 70 does not deviate significantly.

The fixing member 15 has holes 62 through which pins (not shown) are insertable. When the pins are inserted through the holes 62, the fixing member 15 is fixed to the substrate member 53, and accordingly the photoelectric conversion elements 71 are positionally aligned with the lens 55. In this configuration, the adjustment device configured to adjust the positional relationship between the fixing member 15 and the optical holding member 56 clamps and moves the fixing member 15 as a reference of the substrate member 53, and hence the tolerance does not increase unnecessarily and the configuration is simplified.

Figure 6:
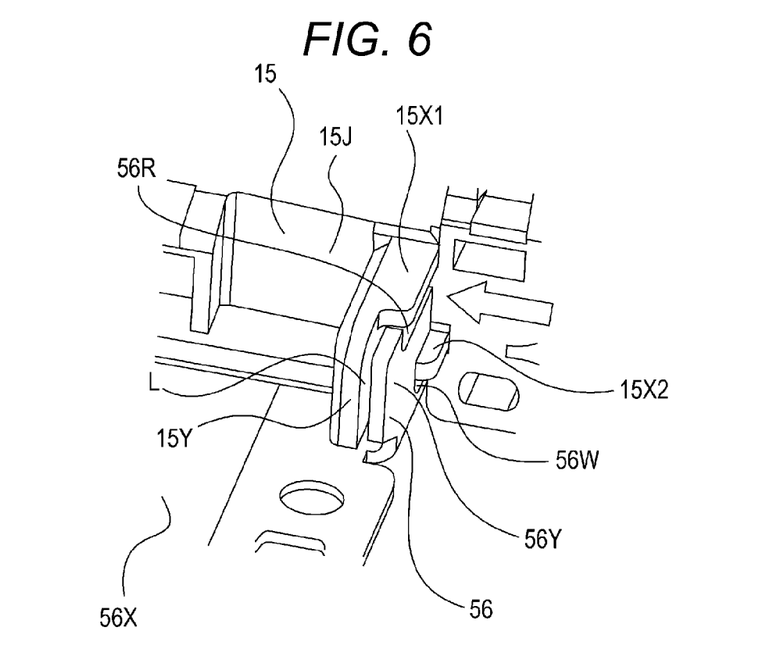
FIG. 6 is a partially enlarged perspective view of illustrating the configuration of the integrated unit in the state in which the adhesive is not applied.

FIG. 6 is a partially enlarged perspective view of illustrating the configuration of the optical holding member 56 and the fixing member 15 in the state in which the adhesive is not applied. The fixing member 15 is fixed to the substrate member 53 on which the CCD sensor 70 as the "photoelectric conversion unit" is mounted, and the bending and protruding portions 15X1 are provided on both sides of the fixing member 15 across an optical axis 50 in a state of protruding toward the opposite side of the optical axis 50, that is, protruding outward. Each bending and protruding portion 15X1 and the corresponding peripheral edge portion 56R have the same shape at their opposing portions so as to maintain the same width in the gap K1, and each axial protruding portion 15X2 and the corresponding cut-away portion 56W have the same shape at their opposing portions so as to maintain the same width in the gap K2. Further, the bending and protruding portion 15X1 protrudes outward beyond the corresponding second plate-shaped portion 56Y. Even when the CCD sensor 70 is adjusted at any position relative to the lens 55, the first plate-shaped portion 15Y is arranged to maintain the clearance L so that the distance between the first plate-shaped portion 15Y and the second plate-shaped portion 56Y does not increase extremely.

In this case, there is no physical contact portion between the optical holding member 56 and the fixing member 15. As described above, the fixing member 15 needs to move freely in the five-axis directions. Therefore, when there is any contact portion therebetween, the fixing member 15 cannot be adjusted in this direction.

Thus, the optical holding member 56 and the fixing member 15 are arranged in the following manner when adjusting the lens 55 and the CCD sensor 70 at optimum positions to read a satisfactory image while canceling the manufacturing errors of the lens 55 and the CCD sensor 70 themselves and the assembly errors therebetween. That is, the optical holding member 56 and the fixing member 15 are arranged in a non-contact state so that the gaps K1 and K2 and the clearance L between the first plate-shaped portion 15Y and the second plate-shaped portion 56Y do not increase extremely.

After the adjustment is finished, the optical holding member 56 and the fixing member 15 are then fixed to each other. As a fixing method, the UV adhesive Q is used in this embodiment. The UV adhesive Q is used for the following advantages. Firstly, the UV adhesive Q requires a short curing time when the adhesive is cured. Secondly, when curing the UV adhesive Q, the adhesive is irradiated with UV light, and hence the timing to cure the adhesive can be controlled. Thirdly, there are many types of UV adhesive Q which has a small shrinkage amount at the time of curing, and hence the amount of displacement after the accurate positional adjustment can be reduced significantly. The UV adhesive Q is applied in the arrow direction (see FIG. 6), and the UV light irradiation is also performed in the arrow direction.

Figure 7A:
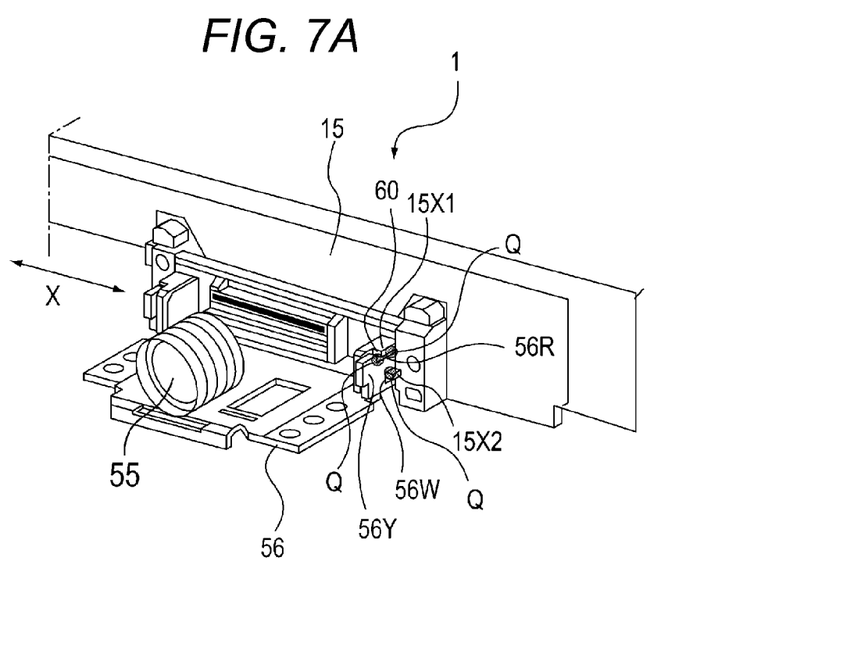
FIG. 7A is a partially enlarged perspective view of illustrating the configuration of the integrated unit in a state in which the adhesive is applied.

FIG. 7A is a partially enlarged perspective view of illustrating the configuration of the optical unit 1 in a state in which the UV adhesive Q is applied. Specifically, the UV adhesive Q is applied to two positions in the gap K1 between the bending and protruding portion 15X1 and the peripheral edge portion 56R. Further, the UV adhesive Q is applied to one position in the gap K2 between the axial protruding portion 15X2 and the cut-away portion 56W. The UV adhesive Q is applied to three positions on one side in the arrow X-direction, and is applied on both sides in the arrow X-direction. Thus, the UV adhesive Q is applied to a total of six positions. Note that, for example, when the UV adhesive Q is applied to the bending and protruding portion 15X1, the UV adhesive Q moves downward due to the viscosity of the UV adhesive Q so that the UV adhesive Q is applied also to the peripheral edge portion 56R of the optical holding member 56 that is located below the bending and protruding portion 15X1.

In this case, the adhesive application portions between the fixing member 15 and the optical holding member 56 correspond to two portions which are line symmetric across the optical axis Z of the lens 55, and hence at least three positions are ensured in each of the two portions. In this configuration, the adhesive application portions 60 between the fixing member 15 and the optical holding member 56 correspond to two portions which are line symmetric across the optical axis of the lens 55, and hence the balance of the shrinkage direction at the time when the UV adhesive Q is cured is improved, resulting in stable fixing. Further, at least three positions are ensured as bonding points for each of the bonding processes, and hence more stable fixing can be performed.

Further, even when the fixing member 15 is adjusted at any position relative to the optical holding member 56, the movement amount of the fixing member 15 is less than 1 mm at most, and hence the length of the bending and protruding portion 15X1 is set in the arrow X-direction so as to cover the clearance L between the first plate-shaped portion 15Y and the second plate-shaped portion 56Y. That is, the bending and protruding portion 15X1 protrudes to have such a length that the peripheral edge portion 56R cannot visually be recognized as seen from above (as seen in the arrow Y-direction) (see FIG. 6). Therefore, even when the fixing member 15 is adjusted at any position relative to the optical holding member 56, the UV adhesive Q applied in the gap K1 between the bending and protruding portion 15X1 and the peripheral edge portion 56R does not easily enter the clearance L between the first plate-shaped portion 15Y and the second plate-shaped portion 56Y. That is, the UV adhesive Q does not easily enter the clearance L between the first plate-shaped portion 15Y and the second plate-shaped portion 56Y, and is applied only in the gap K1 between the bending and protruding portion 15X1 and the peripheral edge portion 56R to the extent possible.

Further, the UV adhesive Q needs to be applied between the optical holding member 56 and the fixing member 15 so as to ensure the symmetry across the optical axis 50. Still further, the UV adhesive Q is applied to the adhesive application portions 60 located at three positions because the release strength in all the directions becomes superior after the bonding. In particular, when the UV adhesive Q is adhered at three positions so as to form a triangle in side view, there is an advantage in that the direction of movement of the fixing member 15 at the time when the UV adhesive Q shrinks through the curing can be set in parallel to the optical axis direction. Note that, even when the bonding is performed at two points on each side or at a larger number of points, the effects of the present invention are still obtained as a matter of course.

Figure 7B:
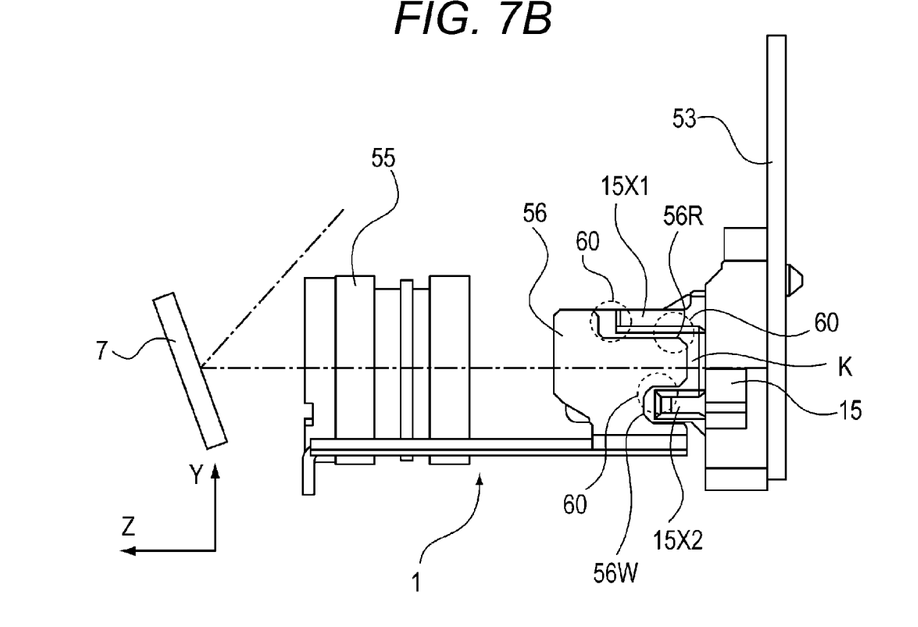
FIG. 7B is a partially enlarged side view of illustrating the configuration of the integrated unit in the state in which the adhesive is applied.

FIG. 7B is a partially enlarged side view of illustrating the configuration of the optical unit 1 in the state in which the UV adhesive Q is applied. The UV adhesive Q is adhered to the adhesive application portions (portions surrounded by dotted lines) 60 located at the three positions in the gaps K1 and K2. In the state before the bonding is performed with the UV adhesive Q, the predetermined gap K1 is set between the bending and protruding portion 15X1 and the peripheral edge portion 56R for the purpose of ensuring an allowable range of movement of the fixing member 15 in the up-down direction (arrow Y-direction) relative to the optical holding member 56. In the state before the bonding is performed with the UV adhesive Q, the predetermined gap K2 is set between the axial protruding portion 15X2 and the cut-away portion 56W for the purposes of ensuring an allowable range of movement of the fixing member 15 in the axial direction of the lens (arrow Z-direction) relative to the optical holding member 56, and of ensuring an allowable range of movement of the fixing member 15 in the vertical direction (arrow Y-direction) relative to the optical holding member 56. Further, the gaps K1 and K2 need to be set so that the respective bonding objects do not separate significantly from each other to avoid the situation that the UV adhesive Q does not reach the respective bonding objects and fails to bond the objects.

Note that, in the state before the bonding is performed with the UV adhesive Q, the predetermined clearance L is set between the first plate-shaped portion 15Y and the second plate-shaped portion 56Y for the purpose of ensuring an allowable range of movement of the fixing member 15 in the direction orthogonal to the axial direction of the lens 55 (arrow X-direction) relative to the optical holding member 56. Further, the clearance L also needs to be set so that the first plate-shaped portion 15Y and the second plate-shaped portion 56Y do not separate significantly from each other.

As has been described above, the shapes of the bending and protruding portions 15X1, the peripheral edge portions 56R, the axial protruding portions 15X2, and the cut-away portions 56W are determined and the dimensions of the gaps K1 and K2 are set so that highly accurate positional adjustment can be performed even when the fixing member 15 is moved in any direction relative to the optical holding member 56.

Figure 8:
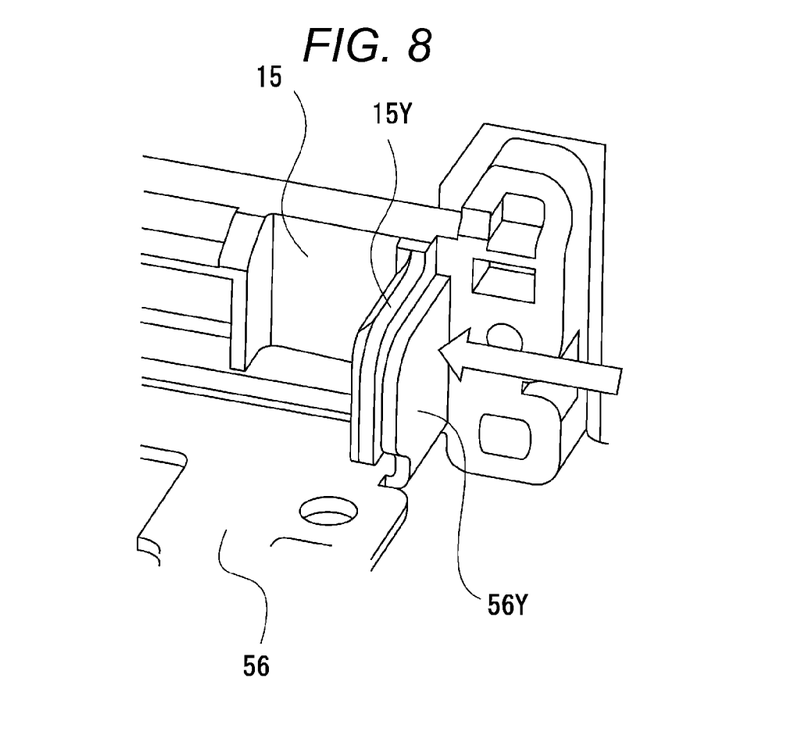
FIG. 8 is a partially enlarged perspective view of illustrating a configuration of an integrated unit according to a comparative example.

FIG. 8 is a partially enlarged perspective view of illustrating a configuration of an integrated unit according to a comparative example. FIG. 8 illustrates an arrangement relationship between the fixing member 15 and the optical holding member 56 in a case where the bending and protruding portions 15X1 are not provided. In the case where the bending and protruding portions 15X1 are not provided or in a case where the length of each bending and protruding portion 15X1 is small and hence the clearance L is generated between the first plate-shaped portion 15Y and the second plate-shaped portion 56Y in a direction along the plate surface, it is assumed that a large clearance L is generated through the positional adjustment of the fixing member 15. In this case, when the adhesive is applied, the adhesive enters the clearance L between the first plate-shaped portion 15Y and the second plate-shaped portion 56Y.

In this case, even when the UV light irradiation is performed in the arrow direction, the effect of the UV light irradiation is exerted in a range of a thickness of about 1 mm from the surface of the UV adhesive Q, resulting in failure in curing the UV adhesive Q. Therefore, even when the UV adhesive Q is cured, sufficient strength cannot be obtained. That is, the amount of the UV adhesive Q to be cured is not constant, resulting in variation in shrinkage direction and shrinkage amount at the time of curing. Further, the distance of the clearance constantly changes due to the positional adjustment, and hence the length and shape obtained after the application of the UV adhesive Q are not uniform in each case. As a result, there arises a risk of variation in curing shrinkage amount after the UV light irradiation for the UV adhesive Q.

In contrast, in the technology described above with reference to FIG. 6, the length of the bending and protruding portion 15X1 is set so as to constantly cover the clearance L extending along the plate surface direction between the first plate-shaped portion 15Y and the second plate-shaped portion 56Y. Therefore, it is possible to suppress the situation that the adhesive enters the clearance extending between the first plate-shaped portion 15Y and the second plate-shaped portion 56Y. Further, it is possible to reduce the excess amount of the UV adhesive Q.

Further, the application amount of the UV adhesive Q and the UV light irradiation period are adjusted, and hence the UV adhesive Q can be cured in a constant curing shrinkage amount. Still further, the following operation can be performed to enhance the stability of a product significantly. That is, the fixing member 15 is positionally adjusted, and is then moved by the curing shrinkage amount immediately before the application of the UV adhesive Q. Accordingly, the adhesive can be cured so that the fixing member 15 is located at substantially the same position as the position determined through the positional adjustment.

Further, in the conventional technology, a general method is employed to apply the adhesive in the clearance between the members. Therefore, the member which may cover the adhesive as seen from the UV light irradiation side, that is, the second plate-shaped portion 56Y of the optical holding member 56 in the configuration of the present invention, needs to be substantially transparent so that the UV light passes through the member. Still further, it is necessary to separately provide a highly accurate member to hold the lens 55. However, in the technology of the present invention, both the components can be integrated with each other, with the result that the cost can be reduced and the configuration can be simplified, which may lead to simplification of the configuration of the jig for positional adjustment.

Further, with one of the configurations according to the embodiment of the present invention, which are described with reference to the drawings, the fixing member 15 is fixed with high accuracy to the substrate on which the CCDs 71 as the photoelectric conversion unit are mounted, and also has the function of the light shielding unit configured to cover the CCDs 71 to prevent light other than the light along the optical axis from entering the CCDs 71.

This is because the fixing member 15 is made of a resin material. In this embodiment, the UV adhesive Q is adhered in the gaps K1 and K2 between the fixing member 15 made of a resin material and the optical holding member 56 made of a metal material. The conventional fixing method in which the UV adhesive Q is poured into the clearance may result in a large bonding region for bonding the surfaces of both the members with the surfaces facing each other.

When the temperature changes in this state, due to the difference in coefficient of linear expansion between the members made of different materials, the UV adhesive is subjected to a stress to raise a risk of breakage. Therefore, it is desired that both the members be made of the same material. When the members are fixed through bonding performed in a small region at a large number of points as in the embodiment of the present invention, the breakage due to the difference in coefficient of linear expansion can be suppressed to the extent possible. Further, when the UV adhesive Q is adhered and cured at a large number of points, the amount of the UV adhesive to be used at a single point becomes smaller, thereby producing an advantage in that the curing shrinkage amount of the UV adhesive becomes smaller.

As a matter of course, even in a case of bonding other than the bonding performed at a plurality of points, or even in a case of applying the UV adhesive Q to the entire bending and protruding portion 15X1, there is no problem as long as the difference in coefficient of linear expansion between the fixing member 15 and the optical holding member 56 is small and the temperature change is small. On the contrary, the bonding area is increased so that higher curing strength is expected.

According to the configuration of this embodiment, it is possible to couple the fixing member 15 fixed to the substrate member 53 and the optical holding member 56 configured to support the lens 55 on the assumption that highly accurate positional adjustment is performed without the need for other coupling components. The fixing member 15 and the optical holding member 56 are fixed through the UV bonding without using the intermediate member while performing, for example, highly accurate six-axis adjustment of the lens 55 and the photoelectric conversion elements 71. Accordingly, it is possible to reduce the positional displacement between the lens 55 and the photoelectric conversion elements 71 after the UV adhesive Q is cured, and to obtain a satisfactory read image with less misfocusing and color misregistration.

Specifically, the fixing member 15 includes the bending and protruding portions 15X1 which protrude in the direction orthogonal to the sub scanning direction Y or the optical axis direction Z of the lens 55. The gap K1 is formed between each bending and protruding portion 15X1 and the optical holding member 56, and hence light can irradiate the gap K1 after the six-axis adjustment of the lens 55 and the photoelectric conversion elements 71. That is, the gap K1 is arranged at a position exposed outward, and hence the gap K1 is located at such a position that the light can reach the gap K1 when the gap K1 is irradiated with light from the outside. Therefore, there is no need to use transparent members as the fixing member 15 and the optical holding member 56, neither to provide the intermediate member when joining the fixing member 15 and the optical holding member 56 to each other.

Further, a constant distance is set between the fixing member 15 fixed to the substrate member 53 and the optical holding member 56 configured to support the lens 55, and hence the adjustment in, for example, the six-axis directions can be realized freely irrespective of the accuracy of the components. Therefore, it is possible to freely perform the positional adjustment of the CCDs 71, and to perform highly accurate bonding and fixing with a smaller number of components, with the result that a high-quality product can be manufactured at low cost.

Note that, the following configuration of the integrated unit may be employed instead of the configuration described in this embodiment. This configuration will be described with reference to FIGS. 9A and 9B. In the embodiment described above, the first plate-shaped portions 15Y are formed in the fixing member 15, and the second plate-shaped portions 56Y are formed in the optical holding member 56. Further, the first plate-shaped portions 15Y are arranged on the inner side of the second plate-shaped portions 56Y in the arrow X-direction. In contrast, in the modification example, second plate-shaped portions 15Y are formed in the fixing member 15, and first plate-shaped portion 56Y are formed in the optical holding member 56. Further, the first plate-shaped portions 56Y are arranged on the inner side of the second plate-shaped portions 15Y in the arrow X-direction. In short, in this embodiment, the plate-shaped portions of the fixing member are arranged on the inner side, whereas in the modification example, the plate-shaped portions of the fixing member are arranged on the outer side.

Figure 9A:
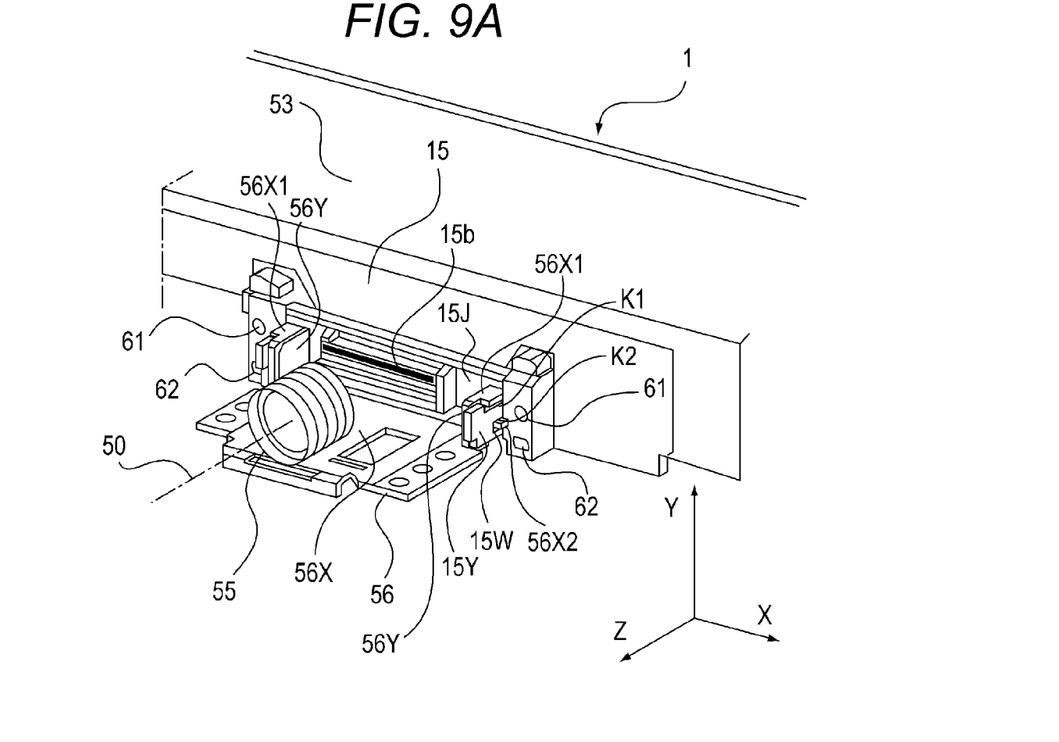
FIGS. 9A and 9B are partially enlarged perspective views of illustrating a configuration of an integrated unit according to a modification example of the present invention.
Figure 9B:
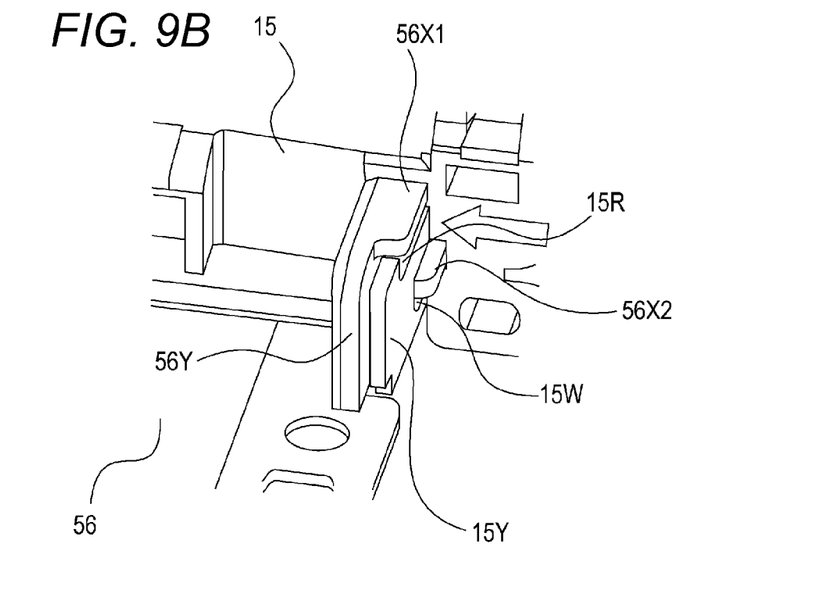

In other details, the fixing member 15 includes the second plate-shaped portions 15Y extending in the up-down direction including the axis of the lens 55, peripheral edge portions 15R which are formed in the second plate-shaped portions 15Y and opposed to bending and protruding portions 56X1, respectively, and cut-away portions 15W which are formed in the second plate-shaped portions 15Y and opposed to axial protruding portions 56X2, respectively. The second plate-shaped portions 15Y overlap with the axis of the lens 55 as viewed along the direction perpendicular to the up-down direction. The optical holding member 56 includes the first plate-shaped portions 56Y extending in the up-down direction including the axis of the lens 55, the bending and protruding portions 56X1 which bend and protrude respectively from the first plate-shaped portions 56Y in the direction orthogonal to the axis of the lens 55, and the axial protruding portions 56X2 which protrude respectively from the first plate-shaped portions 56Y in the direction parallel to the axis of the lens 55. The first plate-shaped portions 56Y overlap with the axis of the lens 55 as viewed along the direction perpendicular to the up-down direction. Similarly to the case described above in this embodiment, the first plate-shaped portions 56Y and the second plate-shaped portions 15Y, the bending and protruding portions 56X1 and the peripheral edge portions 15R, and the axial protruding portions 56X2 and the cut-away portions 15W are respectively arranged in a non-contact state to maintain the predetermined gaps K1 and K2 therebetween. Further, the UV adhesive Q is applied, adhered, and irradiated with light in the gap K1 between the bending and protruding portion 56X1 and the peripheral edge portion 15R and in the gap K2 between the axial protruding portion 56X2 and the cut-away portion 15W.

In this configuration, the protruding portions 15X are not formed in the fixing member 15, but the protruding portions are formed in the optical holding member 56. The same effects can be obtained even in the above-mentioned configuration in which the protruding portions of the optical holding member 56 protrude beyond the fixing member 15.

As has been described above, one of the optical holding member 56 and the fixing member 15 includes the bending and protruding portions and the axial protruding portions as the "protruding portion" which protrudes toward the other of the optical holding member 56 and the fixing member 15, and the other of the optical holding member 56 and the fixing member 15 includes the peripheral edge portions and the cut-away portions as the "recessed portion". The protruding portion and the recessed portion are arranged while crossing each other in a non-contact state to maintain a gap therebetween. The UV adhesive Q is applied in the gap formed between the protruding portion and the recessed portion.

According to the embodiment of the present invention, it is possible to couple the fixing member fixed to the substrate member and the support member configured to support the optical system on the assumption that highly accurate positional adjustment is performed without the need for other coupling components and transparent members.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2012-006602, filed Jan. 16, 2012, and No. 2012-263698, filed Nov. 30, 2012, which are hereby incorporated by reference herein in their entirety.

What is claimed is:

1. An image reading apparatus configured to read an image of an original, the image reading apparatus comprising:
    a light source configured to irradiate the original with light;
    an optical system configured to condense and image a light beam emitted from the light source and reflected from a surface of the original;
    a substrate member having a photoelectric conversion unit arranged in an imaging position of the optical system;
    a fixing member fixed to the substrate member;
    a support member configured to support the optical system; and
    an adhesive bonding the fixing member and the support member together,
    wherein one of the support member and the fixing member has a protruding portion that protrudes toward the other of the support member and the fixing member,
    wherein the other of the support member and the fixing member has a recessed portion that is opposed to the protruding portion,
    wherein the protruding portion is arranged to protrude in the recessed portion in a non-contact state to maintain a gap between the protruding portion and the recessed portion, and
    wherein the adhesive is applied to the gap between the protruding portion and the recessed portion.

2. The image reading apparatus according to claim 1,
    wherein the one of the support member and the fixing member is the fixing member,
    wherein the fixing member comprises:
        a first plate-shaped portion extending in an up-down direction with respect to an axis of the optical system; and
        a bending and protruding portion serving as the protruding portion, the bending and protruding portion bending and protruding from the first plate-shaped portion in a direction orthogonal to the axis of the optical system,
    wherein the other of the support member and the fixing member is the support member, and
    wherein the support member comprises:
        a second plate-shaped portion extending in the up-down direction with respect to the axis of the optical system; and
        a peripheral edge portion serving as the recessed portion, the peripheral edge portion being formed in the second plate-shaped portion and opposed to the bending and protruding portion.

3. The image reading apparatus according to claim 1,
    wherein the one of the support member and the fixing member is the fixing member,
    wherein the fixing member comprises:
        a first plate-shaped portion extending in an up-down direction with respect to an axis of the optical system; and
        an axial protruding portion serving as the protruding portion, the axial protruding portion protruding from a surface of the first plate-shaped portion in a direction parallel to the axis of the optical system,
    wherein the other of the support member and the fixing member is the support member, and
    wherein the support member comprises:
        a second plate-shaped portion extending in the up-down direction with respect to the axis of the optical system; and
        a cut-away portion serving as the recessed portion, the cut-away portion being formed in the second plate-shaped portion and opposed to the axial protruding portion.

4. The image reading apparatus according to claim 1,
    wherein the one of the support member and the fixing member is the fixing member,
    wherein the fixing member comprises:
        a first plate-shaped portion extending in an up-down direction with respect to an axis of the optical system;
        a bending and protruding portion serving as the protruding portion, the bending and protruding portion bending and protruding from the first plate-shaped portion in a direction orthogonal to the axis of the optical system; and
        an axial protruding portion serving as the protruding portion, the axial protruding portion protruding from a surface of the first plate-shaped portion in a direction parallel to the axis of the optical system,
    wherein the other of the support member and the fixing member is the support member, and
    wherein the support member comprises:
        a second plate-shaped portion extending in the up-down direction with respect to the axis of the optical system;
        a peripheral edge portion serving as the recessed portion, the peripheral edge portion being formed in the second plate-shaped portion and opposed to the bending and protruding portion; and
        a cut-away portion serving as the recessed portion, the cut-away portion being formed in the second plate-shaped portion and opposed to the axial protruding portion.

5. The image reading apparatus according to claim 1,
    wherein the one of the support member and the fixing member is the support member,
    wherein the support member comprises:

a first plate-shaped portion extending in an up-down direction with respect to an axis of the optical system; and a bending and protruding portion serving as the protruding portion, the bending and protruding portion bending and protruding from the first plate-shaped portion in a direction orthogonal to the axis of the optical system, wherein the other of the support member and the fixing member is the fixing member, and wherein the fixing member comprises:

a second plate-shaped portion extending in the up-down direction with respect to the axis of the optical system; and a peripheral edge portion serving as the recessed portion, the peripheral edge portion being formed in the second plate-shaped portion and opposed to the bending and protruding portion.

6. The image reading apparatus according to claim 1, wherein the one of the support member and the fixing member is the support member, wherein the support member comprises:

a first plate-shaped portion extending in an up-down direction with respect to an axis of the optical system; and an axial protruding portion serving as the protruding portion, the axial protruding portion protruding from a surface of the first plate-shaped portion in a direction parallel to the axis of the optical system, wherein the other of the support member and the fixing member is the fixing member, and wherein the fixing member comprises:

a second plate-shaped portion extending in the up-down direction with respect to the axis of the optical system; and a cut-away portion serving as the recessed portion, the cut-away portion being formed in the second plate-shaped portion and opposed to the axial protruding portion.

7. The image reading apparatus according to claim 1, wherein the one of the support member and the fixing member is the support member, wherein the support member comprises:

a first plate-shaped portion extending in an up-down direction with respect to an axis of the optical system;

a bending and protruding portion serving as the protruding portion, the bending and protruding portion bending and protruding from the first plate-shaped portion in a direction orthogonal to the axis of the optical system; and an axial protruding portion serving as the protruding portion, the axial protruding portion protruding from a surface of the first plate-shaped portion in a direction parallel to the axis of the optical system, wherein the other of the support member and the fixing member is the fixing member, and wherein the fixing member comprises:

a second plate-shaped portion extending in the up-down direction with respect to the axis of the optical system;

a peripheral edge portion serving as the recessed portion, the peripheral edge portion being formed in the second plate-shaped portion and opposed to the bending and protruding portion; and a cut-away portion serving as the recessed portion, the cut-away portion being formed in the second plate-shaped portion and opposed to the axial protruding portion.

8. The image reading apparatus according to claim 1, wherein the fixing member serves also as a shielding unit configured to cover and shield the photoelectric conversion unit to prevent a light beam other than a proper light beam from reaching the photoelectric conversion unit, the proper light beam being reflected from the original and then passing through the optical system along a proper optical path so as to be imaged on the photoelectric conversion unit.

9. The image reading apparatus according to claim 1, wherein the fixing member and the support member are bonded together at two portions that are line symmetric across an axis of the optical system, and each of the two portions comprises at least three positions ensured therein.

10. The image reading apparatus according to claim 1, wherein the fixing member comprises a hole through which a pin is insertable, and wherein the pin is inserted through the hole so that the fixing member is fixed to the substrate member and the photoelectric conversion unit is positioned with respect to the optical system.

11. The image reading apparatus according to claim 1, wherein the adhesive comprises a photocurable adhesive.

12. An image forming apparatus comprising:

an image forming portion configured to form an image; and an image reading apparatus as recited in claim 1.

13. An image reading apparatus configured to read an image of an original by irradiating the original and receiving a light reflected from the original, the image reading apparatus comprising:

a light receiving unit configured to receive the light reflected from the original;

an optical unit configured to guide the light reflected from the original to the light receiving unit;

a first support unit configured to support the light receiving unit;

a second support unit configured to support the optical unit; and an adhesive bonding the first support unit and the second support unit together, wherein one of the first support unit and the second support unit has a protruding portion, wherein the other of the first support unit and the second support unit has a recessed portion that is opposed to the protruding portion, and wherein the adhesive is applied between the protruding portion and the recessed portion that are disposed in a loose fit.

14. The image reading apparatus according to claim 13, wherein after positions of the light receiving unit and the optical unit are determined, the adhesive is applied between the protruding portion and the recessed portion.

15. The image reading apparatus according to claim 13, wherein the first support unit comprises:

a first plate-shaped portion extending in an up-down direction with respect to an axis of the optical unit; and a bending and protruding portion serving as the protruding portion, the bending and protruding portion bending and protruding from the first plate-shaped portion in a direction orthogonal to the axis of the optical unit, wherein the second support unit comprises:

a second plate-shaped portion extending in the up-down direction with respect to the axis of the optical unit; and a peripheral edge portion serving as the recessed portion, the peripheral edge portion being formed in the second plate-shaped portion and opposed to the bending and protruding portion.

16. The image reading apparatus according to claim 13, wherein the first support unit serves also as a shielding unit configured to cover and shield the light receiving unit to prevent a light beam other than a proper light beam from reaching the light receiving unit, the proper light beam being reflected from the original and then passing through the optical unit along a proper optical path so as to be imaged on the light receiving unit.

17. The image reading apparatus according to claim 13, wherein the first support unit and the second support unit are bonded together at two portions that are line symmetric across an axis of the optical unit, and each of the two portions comprises at least three positions ensured therein.

18. The image reading apparatus according to claim 13,
wherein the first support unit comprises a hole through which a pin is insertable, and
wherein the pin is inserted through the hole so that the first support unit is fixed to a substrate having the light receiving unit, and the light receiving unit is positioned with respect to the optical unit.

19. The image reading apparatus according to claim 13, wherein the adhesive comprises a photocurable adhesive.

20. An image forming apparatus comprising:
an image forming portion configured to form an image; and
an image reading apparatus as recited in claim 13.

* * * * *